United States Patent [19]

Riedel et al.

[11] Patent Number: 5,916,391
[45] Date of Patent: Jun. 29, 1999

[54] FIRE-RETARDANT ADHESIVE THERMOPLASTIC FILM

[75] Inventors: Tevan A. Riedel; Conrad Lee Hinsley, Jr., both of Escondido, Calif.

[73] Assignee: Maritime Resource Group, Escondido, Calif.

[21] Appl. No.: 08/802,540

[22] Filed: Feb. 18, 1997

Related U.S. Application Data

[60] Provisional application No. 60/012,872, Mar. 5, 1996.

[51] Int. Cl.$^6$ .................................................... B32B 31/00
[52] U.S. Cl. ...................... 156/71; 428/355 RA; 428/921
[58] Field of Search ....................... 156/71; 428/355 RA, 428/921, 343; 252/609

[56] References Cited

U.S. PATENT DOCUMENTS

| | | |
|---|---|---|
| 3,940,547 | 2/1976 | Needham et al. ............... 156/307.7 X |
| 4,035,546 | 7/1977 | Ruppert, Jr. ........................ 156/71 X |
| 4,061,826 | 12/1977 | Petras et al. . |
| 4,110,296 | 8/1978 | Wang . |
| 4,207,374 | 6/1980 | Groff . |
| 4,315,969 | 2/1982 | Login et al. . |
| 4,588,627 | 5/1986 | Isaksen et al. ............................. 428/80 |
| 4,599,265 | 7/1986 | Esmay ............................... 428/355 RA |
| 4,626,397 | 12/1986 | Bose . |
| 4,683,094 | 7/1987 | Sharps, Jr. . |
| 4,833,132 | 5/1989 | Spillert et al. . |
| 4,981,544 | 1/1991 | Nordale ................................... 156/252 |
| 4,992,331 | 2/1991 | DeCoste, Jr. ............................ 428/354 |
| 5,160,788 | 11/1992 | Feinberg . |
| 5,186,782 | 2/1993 | Freedman . |
| 5,204,032 | 4/1993 | Ramamurthy et al. . |
| 5,473,016 | 12/1995 | Fujii et al. ................................ 525/74 |
| 5,496,636 | 3/1996 | Gu et al. . |
| 5,595,817 | 1/1997 | Schafer et al. ....................... 156/327 X |
| 5,599,601 | 2/1997 | Polski et al. ............................ 428/40.1 |
| 5,705,006 | 1/1998 | Roudebush et al. .................. 156/94 X |
| 5,707,729 | 1/1998 | Satoh ...................................... 428/344 |

*Primary Examiner*—Mark A. Osele
*Attorney, Agent, or Firm*—Knobbe, Martens, Olson & Bear, LLP

[57] ABSTRACT

A fire-retardant thermoplastic film having a water-based pressure-sensitive adhesive. Liquid thermoplastic resin is mixed with a fire-retardant material, then subjected to a blow molding process to form a film. An adhesive is then applied to one side of the film. The film is used for protecting various surfaces in the maritime industry during construction.

30 Claims, No Drawings

FIRE-RETARDANT ADHESIVE THERMOPLASTIC FILM

CROSS-REFERENCE TO RELATED APPLICATIONS

This application claims priority to U.S. provisional application Ser. No. 60/012,872, filed Mar. 5, 1996.

FIELD OF THE INVENTION

The present invention relates to fire-retardant protective coverings. More particularly, the invention relates to fire-retardant thermoplastic film and its use in protecting surfaces in the maritime industry.

BACKGROUND OF THE INVENTION

During construction aboard ships, it is necessary to protect various surfaces from damage caused by workers' activities such as construction, painting, refit, new build, maintenance and repair. Surfaces requiring such protection include carpet, glass, decks, tile, flooring, fiberglass and bulkheads. Current methods of temporarily protecting such surfaces include the use of drop cloths, tarps, polycarbonate sheeting and polyethylene sheeting with pressure sensitive adhesive (AMERICOVER CARPET COVER™, Maritime Resource Group, San Diego, Calif.; Carpet Mask, Poly-Tak Protection Systems, Huntington Beach, Calif.).

Fire safety is increasingly recognized as being important aboard ships and in many other industries, especially during building and construction. These are particularly dangerous periods because the chance of fire is significantly increased during these activities. Fires are particularly life threatening aboard a ship. Although some ship owners require that such materials be fire-retardant, no laws exist in the United States or Europe requiring such protective materials to be fire retardant in the maritime industries.

Fire-retardant materials currently used as temporary protective coverings include non-adhesive fire-retardant 10–30 mil polyvinyl chloride (PVC) or polyethylene film (COVERGUARD™, Bainbridge Aquabatten, Canton, Mass.; MEGA FILM™, Mega Film Ltd., Berkshire, U.K.), fire-retardant plywood, door skins, herculite, bergboard and foil paper. Each of these materials must be taped in place, a cumbersome, time-consuming process considering the typical areas on a ship which must be covered prior to construction activity and the area shapes and sizes aboard a ship to be protected. Because commercial ships are rarely out of commission for more than 15 days during a wet or dry dock, the time taken to protect surfaces before work can commence is critical. Moreover, the majority of these materials are fairly expensive.

In addition to the maritime industries, there are numerous other situations in which protective coverings can advantageously be applied to surfaces. Those situations include conventional building construction and renovation, aircraft repairs, painting, automobile maintenance, and the like. Although the need for fire retardant properties in such coverings has not been well realized in the prior art, such properties provide a significant advantage.

Thus, there is a need for an easy-to-install, effective, inexpensive temporary fire-retardant protective covering for ship surfaces and other surfaces, such as those in other vehicles, living areas and work areas. The present invention satisfies this need.

SUMMARY OF THE INVENTION

One embodiment of the present invention is a temporary protectant for a surface within a living area, vehicle or work area comprising a thermoplastic film having a fire-retardant material incorporated directly therein and having a pressure-sensitive releasable adhesive on one of its sides that leaves substantially no adhesive residue upon removal of the protectant from a living area surface. Advantageous adhesives include water-based adhesives, such as water-based emulsions. Preferably, the thermoplastic film comprises polyvinyl chloride, nylon, polyethylene, polyolefin or polycarbonate; more preferably, the polymer is polyethylene; most preferably, the polyethylene is a blend of about 70% linear low density polyethylene and about 30% low density polyethylene. According to another aspect of this preferred embodiment, the surface is upholstery, carpet, glass, fiberglass, stainless steel, bulkheads, soft panels, furnishings or marble. Advantageously, the surface is carpet. Preferably, the thermoplastic film has a thickness of between about 0.5 and about 30 mils; more preferably, the thermoplastic film has a thickness between about 6 and about 10 mils; most preferably, the thermoplastic film has a thickness of about 8 mils. In another aspect of this preferred embodiment, the thermoplastic film has a thickness of between about 2 and about 4 mils; more preferably about 3 mils. Advantageously, the fire retardant material comprises an acrylic emulsion or antimony oxide and the adhesive is an acrylic adhesive. Preferably, the covering is used for up to about 45 days.

Another embodiment of the invention is a method for protecting a living area surface, comprising applying to the surface a thermoplastic film containing a fire-retardant material incorporated directly therein and having a water-based pressure-sensitive adhesive on one of its sides. According to one aspect of this preferred embodiment, the adhesive is water-based. Preferably, the thermoplastic film comprises polyvinyl chloride, nylon, polyethylene, polyolefin or polycarbonate; more preferably, the polymer is polyethylene; most preferably, the polyethylene is a blend of about 70% linear low density polyethylene and about 30% low density polyethylene. According to another aspect of this preferred embodiment, the surface is carpet, glass, fiberglass, stainless steel, bulkheads, soft panels, furnishings or marble. One example of such a surface is carpet. Preferably, the thermoplastic film has a thickness of between about 0.5 and about 25 mils; more preferably, the thermoplastic film has a thickness between about 6 and about 10 mils; most preferably, the thermoplastic film has a thickness of about 8 mils. In another aspect of this preferred embodiment, the thermoplastic film has a thickness of between about 2 and about 4 mils; more preferably about 3 mils. Advantageously, the fire retardant material comprises antimony oxide and the adhesive is an acrylic adhesive. Preferably, the covering is used for up to about 45 days.

DETAILED DESCRIPTION OF THE PREFERRED EMBODIMENTS

The present invention provides temporary protective thermoplastic films containing a fire-retardant material. A pressure sensitive releasable adhesive such as a water-based adhesive is applied to one side of the thermoplastic film. The films may be used as protective coverings for up to about 45 days without transfer of the adhesive to the surface onto which the films are placed. The adhesive is applied to one side of the film and the film is reverse rolled, with or without a release coating or release paper, allowing the film to be rolled onto a desired surface quickly and easily.

The thermoplastic films of the invention are effective, fire safe, and easy to install and remove. Traditional protective coverings must be cut and taped into place, a time-consuming and labor-intensive process. Furthermore, tape rarely provides satisfactory adhesion and thus will not hold up well to construction activities. Moreover, constant touch-up repairs are necessary and there is a trip hazard associated with shifted or damaged floor coverings. In contrast, the film of the present invention will remain adhered to the surface and will not present such a hazard. The instant films leave no residue when removed, compared to conventional duct tape used to secure other temporary protective coverings which leaves a difficult to remove residue on almost every surface. The films of the invention can be installed and removed, on average, in less than 50% of the time necessary to install and remove traditional forms of temporary protection.

As used herein, the term "thermoplastic" refers to a high polymer that softens when exposed to heat and returns to its original condition when cooled to room temperature. Many such materials are known in the art and are contemplated for use in the present invention, including polyvinyl chloride (PVC), nylons, fluorocarbons, low density polyethylene, linear low density polyethylene, linear high density polyethylene, polyurethane prepolymer, polystyrene, polypropylene, polycarbonate, polyethylene terephthalate, ethylene vinyl acetate, polyolefins, cellulosic resins, acrylic resins and copolymers, block copolymers, blends, and mixtures thereof. A blend of about 70% linear low density polyethylene and about 30% low density polyethylene is particularly preferred for use in the present invention.

In a preferred embodiment, the thermoplastic films of the invention have thicknesses of between about 0.5 mils and about 25 mils. The determination of which thickness to use will depend on the particular application desired. For example, in carpet and glass protection, the film can have a thickness between about 2 and about 4 mils. In a particularly preferred embodiment, the film has a thickness of about 3 mils. For glass protection from harsher construction activities including painting, sandblasting and welding operations, it is preferred that the thickness be between about 6 and about 10 mils, most preferably about 8 mils.

The films of the invention may advantageously range in width from about 15 to about 250 mm and in length from about 15 to about 1000 meters. Of course, the films may be cut to fit any particular area. Nonlimiting examples of surfaces contemplated for protection by the films of the invention include carpets, upholstery, decks, furniture, soft panels, floors, bulkheads, marble, cultured marble, mirrors, glass, plexiglas, stainless steel, aluminum, high and low pressure laminates and fiberglass.

Many fire-retardant agents may be used to form the films of the present invention. As defined herein, a fire retardant is a substance applied to or incorporated in a combustible material to reduce or eliminate its tendency to ignite when exposed to a low-energy flame such as a match or cigarette. The term "fire-retardant" is intended to include single fire-retardant agents or combinations thereof. The fire retardant may be applied to the thermoplastic film as a coating or surface finish. Alternatively, the fire retardant may be applied in the form of a solution or may be blended with the liquid polymer prior to formation of the thermoplastic film. The amount of fire retardant added to the polymer will vary depending on the degree of protection required, although the amount added typically ranges from about 0.01% to about 30; preferably from about 0.1% to about 10% or about 1% to about 5%; and most preferably about 2.5%.

Fire-retardants contemplated for use in the invention include inorganic fire retardants such as ammonium sulfamate, zinc borate, antimony oxide, antimony oxychloride ammonium bromide, hydrated aluminum oxide, phosphonitrilic chloride; and organic fire retardants such as halogenated organic fire retardants (i.e., brominated alkoxydiphenyl sulfone, chlorendic anhydride, chlorinated paraffins, halogenated organic polyphosphonate); vinyl acetate; vinyl chloride and acrylic emulsions (i.e. methyl methacrylate); alkyl diaryl phosphate; cresyl diphenyl phosphate, octyl diphenyl phosphate, trialkyl boron ester; tris (dichloropropyl) phosphate; phosphonate esters and tricresyl phosphate. The various phosphate and antimony oxide formulations are particularly preferred.

The carpet used on cruise ships is tested to C.F.R. 1630 standards. Accordingly, the thermoplastic film of the invention will also meet or exceed this government standard. The fire-retardant thermoplastic films of the invention for use in the U.S. Military will also meet Federal GSA Standard 191 Method 5903 for fire retardant material.

The pressure-sensitive adhesives of the invention vary in tack from 0.5 oz. to 30 oz. per inch to provide adequate adhesion and release from various surfaces without depositing adhesive residue thereon. Preferred adhesives contemplated for use in the invention include water-based emulsions. Exemplary preferred materials are acrylic adhesives (i.e., vinyl acetate 2-ethylhexyl copolymer; FLEXCRYL™ GP-5 acrylic adhesive (Air Products, Allentown, Pa.)). Other suitable adhesives include blends of polyvinyl acetate and polyethylene emulsions (U.S. Pat. No. 4,833,132), Type 33-4030 water-based pressure sensitive emulsion (National Starch and Chemical Corp., Bridgewater, N.J.) and AQUA-LOCK™ 8002 brand adhesive (B.F. Goodrich, Adhesive Systems Division, Akron, Ohio). However, any releasable adhesive having these properties is contemplated for use in the invention.

The use of solvent-based pressure sensitive adhesives is also contemplated. These adhesives are solubilized in an organic solvent which is allowed to evaporate after application of the solution. One example of such an adhesive is polyurethane. However, many such adhesives are known to one of ordinary skill in the art.

Cross-linkers, tackifiers, detackifiers and other conventional additives may also be incorporated into the adhesive to promote or reduce pressure sensitive qualities, in accordance with manufacturer's instructions or conventional industry practices. The fire retardant material can be incorporated into the adhesive, into the film, or both. The adhesives may be applied to the thermoplastic film by any conventional method, such as by brushing, flow brushing, dipping, manual glue gun, simple roller, flow roller, spraying or roll coating. Alternatively, a sheet having release properties may be coated with adhesive, which is then transferred to the film, as by rolling the coated sheet and the film together.

The films of the present invention are typically formed by conventional blown film extrusion. This process involves melting thermoplastic resin pellets or powder to produce a thermoplastic liquid, extruding the liquid through a cylindrical die, and blowing cooling air into the interior of the resulting tubular extrusion to expand and cool the film. The film is subsequently slit and rolled. In an alternative embodiment, the film may be formed by flat sheet extrusion, a process in which a liquid thermoplastic dispersion is forced through a metal forming die, followed by cooling or chemical hardening. Film is made by passing a low-viscosity mixture through a narrow slit. Details of these conventional film manufacturing processes are described, for example, in U.S. Pat. Nos. 5,186,782, 4,626,397, 4,683,094 and 5,204,032, the entire contents of which are hereby incorporated by reference.

A representative example of preparation of a film of the present invention is provided below.

EXAMPLE 1

Polyolefin pellets are melted and mixed with 2.5% antimony oxide. The mixture is blow molded into a film, allowed to harden and cut into sheets. One surface of the film is sprayed with vinyl acetate 2-ethylhexyl copolymer and the adhesive is allowed to dry. The film is then reverse rolled and thereafter is applied to a desired surface. After use, it is easily removed for recycling or disposal.

What is claimed is:

1. A temporary protectant for a surface within a living area or vehicle comprising a thermoplastic film having a fire-retardant material incorporated directly therein, said film having a pressure-sensitive releasable adhesive on one of its sides that leaves substantially no adhesive residue upon removal of the protectant from a surface in the living area or vehicle.

2. The protectant of claim 1, wherein said thermoplastic film comprises a polymer selected from the group consisting of polyvinyl chloride, nylon, polyethylene, polyolefin and polycarbonate.

3. The protectant of claim 2, wherein said polymer is polyethylene.

4. The protectant of claim 3, wherein said polyethylene comprises a blend of about 70% linear low density polyethylene and about 30% low density polyethylene.

5. The protectant of claim 1, wherein said surface is selected from the group consisting of carpet, glass, fiberglass, stainless steel, bulkheads, soft panels, furnishings and marble.

6. The protectant of claim 5, wherein said surface is carpet.

7. The protectant of claim 1, wherein said thermoplastic film has a thickness of between about 0.5 and about 30 mils.

8. The protectant of claim 7, wherein said thermoplastic film has a thickness between about 6 and about 10 mils.

9. The protectant of claim 8, wherein said thermoplastic film has a thickness of about 8 mils.

10. The protectant of claim 9, wherein said thermoplastic film has a thickness of between about 2 and about 4 mils.

11. The protectant of claim 10, wherein said thermoplastic film has a thickness of about 3 mils.

12. The protectant of claim 1, wherein said fire-retardant material comprises an acrylic emulsion or antimony oxide.

13. The protectant of claim 1, wherein said adhesive is a water-based adhesive.

14. The protectant of claim 1, wherein said water-based adhesive is an acrylic adhesive.

15. The protectant of claim 1, wherein said covering is used for up to about 45 days.

16. A method of temporarily protecting a living area or vehicle surface, comprising applying to said surface a thermoplastic film containing a fire-retardant material incorporated directly therein, said thermoplastic film having a water-based pressure-sensitive adhesive on one of its sides.

17. The method of claim 16, wherein said surface is selected from the group consisting of carpet, glass, fiberglass, stainless steel, soft panels, furnishings and marble.

18. The method of claim 17, wherein said surface is carpet.

19. The method of claim 16, wherein said thermoplastic film comprises a polymer selected from the group consisting of polyvinyl chloride, nylon, polyethylene, polyolefin and polycarbonate.

20. The method of claim 19, wherein said polymer is polyethylene.

21. The method of claim 20, wherein said polyethylene comprises a blend of about 70% linear low density polyethylene and about 30% low density polyethylene.

22. The method of claim 16, wherein said thermoplastic film has a thickness of between about 0.5 and about 30 mils.

23. The method of claim 22, wherein said thermoplastic film has a thickness between about 6 and about 10 mils.

24. The method of claim 23, wherein said thermoplastic film has a thickness of about 8 mils.

25. The method of claim 22, wherein said thermoplastic film has a thickness of between about 2 and about 4 mils.

26. The method of claim 25, wherein said thermoplastic film has a thickness of about 3 mils.

27. The method of claim 16, wherein said fire-retardant material comprises antimony oxide.

28. The method of claim 16, wherein said adhesive is a water-based adhesive.

29. The method of claim 28, wherein said water-based adhesive is an acrylic adhesive.

30. The method of claim 29, wherein said covering is used for up to about 45 days.

* * * * *

US005916391C1

(12) REEXAMINATION CERTIFICATE (4761st)
United States Patent
Riedel et al.

(10) Number: US 5,916,391 C1
(45) Certificate Issued: Apr. 8, 2003

(54) FIRE-RETARDANT ADHESIVE THERMOPLASTIC FILM

(75) Inventors: Tevan A. Riedel, Escondido, CA (US); Conrad Lee Hinsley, Jr., Escondido, CA (US)

(73) Assignee: Americover, Escondido, CA (US)

Reexamination Request:
No. 90/006,087, Aug. 20, 2001

Reexamination Certificate for:
Patent No.: 5,916,391
Issued: Jun. 29, 1999
Appl. No.: 08/802,540
Filed: Feb. 18, 1997

Related U.S. Application Data

(60) Provisional application No. 60/012,872, filed on Mar. 5, 1996.

(51) Int. Cl.[7] .......................... B32B 27/08; B32B 31/00
(52) U.S. Cl. ................... 156/71; 428/355 RA; 428/921
(58) Field of Search ............ 156/71, 247; 428/355 RA, 428/343, 921, 355 AC; 252/609

(56) References Cited

U.S. PATENT DOCUMENTS

| | | | |
|---|---|---|---|
| 2,554,791 A | 5/1951 | Nickerson | 117/122 |
| 2,633,432 A | 3/1953 | Kenneway | 117/76 |
| 3,008,850 A | 11/1961 | Ulrich | 117/122 |
| 3,089,786 A | 5/1963 | Nachtsheim et al. | 117/122 |
| 3,212,925 A | 10/1965 | Rosenthal et al. | 117/122 |
| 3,232,785 A | 2/1966 | Smith | 117/76 |
| 3,336,153 A | 8/1967 | Juda | 117/68.5 |
| 3,515,578 A | 6/1970 | Tomita et al. | 117/122 |
| 3,515,579 A | 6/1970 | Shepherd et al. | 117/124 |
| 3,723,139 A | 3/1973 | Larkin et al. | 260/45.75 R |
| 3,869,106 A | 3/1975 | Gregov | 248/345.1 |
| 3,922,464 A | 11/1975 | Silver et al. | 428/355 |
| 3,932,326 A | 1/1976 | Hoh et al. | 260/26 |
| 3,933,721 A | 1/1976 | Wilson | 260/45.85 T |
| 3,933,740 A | 1/1976 | Hopkins et al. | 260/45.75 |
| 3,934,066 A * | 1/1976 | Murch | |
| 3,935,181 A | 1/1976 | Schoen | 260/94.9 H |
| 3,940,547 A * | 2/1976 | Needham et al. | |
| 3,962,498 A | 6/1976 | Owston | 427/322 |
| 3,963,672 A | 6/1976 | Brasure | 260/45.75 B |
| 3,983,290 A | 9/1976 | Elcik | 428/285 |
| 4,012,343 A | 3/1977 | Raley, Jr. | 260/2.5 FP |
| 4,018,962 A | 4/1977 | Pedlow | 428/245 |
| 4,035,546 A * | 7/1977 | Ruppert et al. | |
| 4,040,996 A | 8/1977 | Van Vonno | 260/23 X |
| 4,061,826 A * | 12/1977 | Petras et al. | |
| 4,082,705 A | 4/1978 | Beede et al. | |
| 4,110,296 A * | 8/1978 | Wang | |
| 4,129,535 A | 12/1978 | Elcik | 260/23 X |
| 4,171,330 A | 10/1979 | Kyo et al. | 525/180 |
| 4,207,374 A * | 6/1980 | Groff | |
| 4,212,387 A | 7/1980 | Kotski et al. | 206/223 |
| 4,229,329 A | 10/1980 | Bennett | |
| 4,248,917 A | 2/1981 | Hornibrook et al. | |
| 4,315,969 A * | 2/1982 | Login et al. | |
| 4,346,700 A | 8/1982 | Dunshee et al. | 128/155 |
| 4,587,303 A * | 5/1986 | Turtle | |
| 4,588,627 A * | 5/1986 | Isaksen et al. | |
| 4,599,265 A | 7/1986 | Esmay | |
| 4,623,413 A | 11/1986 | Questel et al. | 156/247 |
| 4,626,397 A * | 12/1986 | Bose | |
| 4,683,094 A * | 7/1987 | Sharps | |
| 4,810,574 A | 3/1989 | Ahner | 428/355 |
| 4,824,709 A | 4/1989 | Tschirch | 428/95 |
| 4,824,912 A * | 4/1989 | Su | |
| 4,833,132 A * | 5/1989 | Spillert et al. | |
| 4,981,544 A | 1/1991 | Nordale | |
| 4,985,302 A | 1/1991 | Sala et al. | 428/343 |
| 4,992,331 A * | 2/1991 | De Coste | |
| 5,085,859 A | 2/1992 | Halloran et al. | |
| 5,103,816 A | 4/1992 | Kirschbaum et al. | 128/207.14 |
| 5,160,788 A * | 11/1992 | Feinberg | |
| 5,186,782 A * | 2/1993 | Freedman | |
| 5,196,246 A | 3/1993 | Kauss et al. | 428/39 |
| 5,204,032 A * | 4/1993 | Ramamurthy et al. | |
| 5,210,142 A * | 5/1993 | Kale et al. | |
| 5,242,963 A | 9/1993 | Mao | 524/272 |
| 5,254,203 A * | 10/1993 | Corston | |
| 5,254,612 A | 10/1993 | Sugi et al. | |
| 5,378,536 A | 1/1995 | Miller et al. | 428/355 |
| 5,389,438 A | 2/1995 | Miller et al. | 428/355 |
| 5,432,009 A | 7/1995 | Tabata et al. | 428/516 |
| 5,461,103 A | 10/1995 | Bafford et al. | 524/460 |
| 5,473,016 A * | 12/1995 | Fujii et al. | |
| 5,496,636 A * | 3/1996 | Gu et al. | |
| 5,524,843 A | 6/1996 | McCauley | |
| 5,595,817 A * | 1/1997 | Schafer et al. | |
| 5,599,601 A | 2/1997 | Polski et al. | |
| 5,705,006 A * | 1/1998 | Roudebush et al. | |
| 5,707,729 A * | 1/1998 | Satoh | |
| 5,761,022 A * | 6/1998 | Rankilor | |
| 5,834,561 A | 11/1998 | Fukumoto et al. | 525/133 |
| 6,296,212 B1 | 10/2001 | Monahan | |

FOREIGN PATENT DOCUMENTS

| | | | |
|---|---|---|---|
| DE | 1 594 240 | * | 8/1969 |
| DE | 4421420 | | 6/1994 |
| EP | 0 109 177 | | 5/1984 |
| EP | 0 305 161 | | 3/1989 |
| EP | 0 352 901 | | 1/1990 |
| EP | 0 437 632 A1 | | 7/1991 |
| EP | 0 494 619 A2 | | 7/1992 |
| EP | 0 494 619 B1 | | 7/1992 |
| EP | 0 615 983 A2 | | 9/1994 |
| EP | 0 494 619 B1 | | 6/1995 |
| EP | 0 775 736 A2 | | 5/1997 |

(List continued on next page.)

OTHER PUBLICATIONS

Irving Skeist, Handbook Of Adhesives, Chapman & Hall, Third Edition, pp. 648–649.*

*Flame–Retardant Polymeric Materials,* vol. 1, Ch. 1, pp. 1–17, Lewin, et al., ed., 1975.

(List continued on next page.)

*Primary Examiner*—Melvin Curtis Mayes

(57) ABSTRACT

A fire-retardant thermoplastic film having a water-based pressure-sensitive adhesive. Liquid thermoplastic resin is mixed with a fire-retardant material, then subjected to a blow molding process to form a film. An adhesive is then applied to one side of the film. The film is used for protecting various surfaces in the maritime industry during construction.

FOREIGN PATENT DOCUMENTS

| | | | |
|---|---|---|---|
| GB | 2 092 476 A | | 8/1982 |
| GB | 2 289 680 | * | 11/1995 |
| JP | 53-082887 | | 7/1978 |
| JP | 61108547 | | 5/1986 |
| JP | 61-172736 | | 8/1986 |
| JP | 62-043336 | | 2/1987 |
| JP | 62-043337 | | 2/1987 |
| JP | 74000 | | 6/1992 |
| JP | 5194915 | | 8/1993 |
| JP | 5-345882 | * | 12/1993 |
| JP | 6145442 | | 3/1994 |
| JP | 6328643 A2 | | 11/1994 |
| JP | 06-328643 | | 11/1994 |
| JP | 7-18226 | * | 1/1995 |
| JP | 7164594 | | 6/1995 |
| WO | WO 81/01151 | | 4/1981 |
| WO | PCT/US89/00384 | | 2/1992 |
| WO | WO 94/12987 | | 6/1994 |
| WO | WO 95/32257 | | 11/1995 |
| WO | 97/05206 | * | 2/1997 |

OTHER PUBLICATIONS

*Flame–Retardant Polymeric Materials,* vol. 1, Ch. 10, pp. 399–455, Lewin, et al., ed., 1975.

*Flame–Retardant Polymeric Materials,* vol. 3, Ch. 1, pp. 1, Ch.2, pp. 39–95, Lewin, et al., ed., 1982.

*Miall's Diectionary of Chemistry,* pp. 38–39, 1990.

*3M Product Information,* date unknown.

*Antimony (III) Oxide,* 99.999%, http://camd.1su.edu/msds/a/antimonyiii_oxide.htm, pp. 1–8, 1997.

*Grant & Hackh's Chemical Dictionary,* $5^{th}$ Ed., p. 46, Roger Grant and Claire Grant, 1987.

*The Merck Index,* $12^{th}$ Ed., 1996, p. 120–121.

*McGraw–Hill Dictionary of Scientific and Technical Terms,* $3^{rd}$ Ed., p. 1043 and 1612, 1974.

*3M Product Information,* FOD# 1593, 1998.

*Command Fire Officer's Instruction No. 1/95.*

Poly–Tak Protection Systems, Inc., http://www.polytak.com, date unknown.

F.W. Billmeyer, Jr., Textbook of Polymer Science, 1971, pp. 452 and 502 (John Wiley & Sons, Inc., New York).

Merriam–Webster's Collegiate Dictionary, 1993, p. 865 and 1213.

J.J. Lagowski, Modern Inorganic Chemistry, 1973, p. 425 (Marcel Dekker, Inc., New York).

Handbook of Chemistry and Psysics, 1957, p. 488 (Chemical Rubber Publishing Co., Formerly of Cleveland).

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–30 are cancelled.

\* \* \* \* \*